3,100,151
INSTANT COFFEE AND TEA
Orville N. Breivik, Westport, Conn., and William R. Johnston, Wayzata, Minn., assignors to Standard Brands Incorporated, New York, N.Y., a corporation of Delaware
No Drawing. Filed Sept. 25, 1962, Ser. No. 226,150
10 Claims. (Cl. 99—71)

Instant coffee and instant tea produced by modern spray drying methods consist of hollow spheres or aggregates thereof. The product prepared in this manner has a low bulk density, is free flowing, and redissolves easily and rapidly upon addition of water. There is a tendency, however, for such instant coffee and instant tea to give a fine, persistent foam when the water is added. In contrast, when a tea infusion is prepared from tea leaves there is little tendency to foam, and when a hot water extract of ground roasted coffee is prepared a coarse, quickly-subsiding foam appears.

Instant coffee and instant tea prepared by spray drying lack a great deal of the flavor and aroma usually associated with freshly prepared infusions. It has been proposed to improve aroma and flavor of instant coffee by incorporating therein coffee oil of fractions thereof containing aroma and flavor constituents. It has been proposed to improve the flavor and aroma of instant tea by incorporating therein extracts or distillates containing aroma and flavor constituents obtained from fresh tea leaf. Such instant coffee and instant tea also give an undesirable fine persistent foam when they are dissolved in water.

An object of the invention is to provide an instant coffee and an instant tea which, when dissolved in water, give little foam. Another object of the invention is to provide spray dried instant coffee and instant tea which, when dissolved in water gives little foam.

Still another object of the invention is to provide aromatized instant coffee and instant tea which, when dissolved in water, will give little foam.

These and other objects of the invention are accomplished by incorporating in instant coffee or instant tea a small amount of a monoglyceride of a higher fatty acid. The glyceride may be a glyceride of fatty acids containing from 12 to 24 carbon atoms, for instance, lauric, oleic, linoleic, linolenic, palmitic, myristic, stearic, arachidic, behenic and lignoceric acids.

Pure monoglyceridies of the higher fatty acids are not available commercially and it would be difficult to prepare them in pure form. Monoglycerides of the higher fatty acids are commonly prepared by the superglycerination of fats and oils or their fatty acids, the major portion of which contain 16 and 18 carbon atoms, for instance by the method described in U.S. Patent 2,206,167. The products obtained by this method are mixture of mono-, di- and tri-glycerides with the monoglycerides predominating. We can use these products in the crude or purified state. They may be purified by washing to remove unreacted glycerin or they may be subjected to treatments such as distillation to obtain preparations containing a higher proportion of monoglycerides.

A number of commercially available monoglyceride preparations are useful, for example, Myverol 18–85, a plastic fat of low softening point described by the manufacturer as a preparation comprising 90% monoglycerides prepared by distillation from the mixed glycerides obtained by superglycerination of refined cottonseed oil; Myverol 18–05, described by the manufacturer as a preparation comprising 90% monoglycerides, obtained by distillation from mixed glycerides obtained by superglycerination of triple-pressed stearic acid; Atmul–122, described by the manufacturer as a mixture of mono-glycerides and diglycerides of the higher fatty acids, containing 61–66% of monoglycerides, a plastic solid, M.P. 125°–127° F.; Atmul–124, described by the manufacturer as a mixture of monoglycerides and diglycerides of the higher fatty acids, containing 61–66% of monoglycerides, M.P. 141–144° F.; Atoms 300, a liquid described by the manufacturer as a mixture of monoglycerides and diglycerides of the higher fatty acids, containing 54–59% of monoglycerides; and Aldo–40, a soft solid, M.P. 93–99° F., described by the manufacturer as a glyceryl oleostearate.

In instant coffee we prefer to use monoglyceride preparations made by superglycerinating coffee oil. The superglycerination is carried out in a manner well known in the art, for instance, by the method described in U.S. Patent 2,206,167. The reaction is advantageously continued until at least about 50% of the glycerides present in the reaction mixture are monoglycerides. The coffee oil may be obtained from green coffee, roasted coffee, spent coffee grounds, or coffee chaff by expression or by extraction with a solvent.

The monglyceride preparation is intimately mixed with the instant coffee or instant tea in any desired manner, for instance in a ribbon mixer. In the case of instant coffee to which coffee oil is added for improvement of aroma and flavor, it is advantageous to disperse the monoglyceride preparation in the coffee oil and to intimately mix this dispersion with the instant coffee.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification, percentages and parts are intended to refer to percent and parts by weight unless otherwise specified.

*Example 1*

25 grams of coffee oil, obtained by extracting ground roasted coffee for 2 hours with methylene chloride in a Soxhlet apparatus, 8.5 grams of glycerine, and 0.02 grams of sodium hydroxide, dissolved in 0.05 ml. of water, were placed in a 250 ml. flask equipped with a thermometer, air condenser and inlet for carbon dioxide gas. The reaction mixture was blanketed with a stream of carbon dioxide gas and the flask and contents were heated in a silicone bath until the temperature of reaction mixture reached 250° C. The temperature was maintained at 245° C. to 250° C. for 30 minutes, during which time the mixture was frequently agitated. The mixture was then allowed to cool to below 150° C. and was filtered with suction on a Büchner funnel. Upon cooling to room temperature, the reaction mixture hardened to a soft, waxy mass. A small quantity of unreacted glycerine separated out below the main body of the reaction mixture and was discarded.

0.025 gram of the waxy monoglyceride preparation thus obtained was ground in a mortar with 1.0 gram of the granular, free flowing instant coffee obtained by spray drying a water extract of roasted coffee. The mixture was then rolled for 30 minutes with 99.0 grams of granular, free flowing instant coffee, using a glass jar equipped with a baffle. This preparation was estimated to contain 125 parts of monoglyceride per million parts of instant coffee.

A sample of the resulting product was compared for foaming characteristics with a control sample of spray dried instant coffee containing no added monoglyceride. To carry out this test 2.25 grams of each sample were placed in 150 ml. cups and hot water, which had just been boiled for 2–3 minutes, was poured rapidly into the cups. The control sample showed a frothy foam which persisted for several minutes. The other sample foamed initially, but the foam bubbles broke quickly to leave a clean surface in the center with only a ring of coarse bubbles clinging to the edge of the cup.

*Example 2*

100 parts of coffee oil, obtained by extraction of roasted ground coffee with an organic solvent, and 34 parts of glycerine were charged to a reactor. The charge was blanketed with carbon dioxide, to prevent contact with air, throughout the reaction. The charge was heated to 246° C. to 249° C. and 0.07 part of calcined CaO was added and the batch was permitted to react for 30 minutes, with stirring. The charge was then cooled to about 149° C. and filtered to remove the catalyst. The filtered mixture was allowed to stand overnight at room temperature in a stainless steel kettle having a coarse screen in the bottom and a valve opening. The valve was opened to withdraw a small amount of glycerine which separated. The remaining material consisted of 110 parts of a crude monoglyceride preparation. Analysis by conventional methods indicated that about 50% of the glycerides in this preparation are monoglycerides.

4 grams of coffee oil, obtained by extracting roasted ground coffee with an organic solvent, were heated to 49° C. in a water bath. A sample of the monoglyceride preparation, prepared as described in this example, was melted in a water bath, and 1.88 grams were weighed out and thoroughly mixed with the coffee oil. Then 19.12 grams of coffee oil were added. This mixture contained the following:

|  | Grams |
|---|---|
| Coffee oil | 23.12 |
| Superglycerinated coffee oil | 1.88 |
|  | 25.00 |

0.5 gram of this mixture was mixed thoroughly and uniformly with 99.0 grams of granular, free flowing spray dried instant coffee, using a Blendette mixer and mixing for 4 minutes. This preparation was estimated to contain 188 parts of monoglyceride per million parts of instant coffee.

A sample of the product thus obtained and a control sample, prepared by thoroughly mixing 0.5 gram of coffee oil with 99.5 grams of granular, free flowing spray dried instant coffee, were subjected to the foaming test described in Example 1. The control sample showed a frothy foam which persisted for several minutes while the sample containing monoglycerides foamed initially but the bubbles broken quickly, leaving a clean surface in the center of the cup and only a ring of coarse bubbles clinging to the edge of the cup.

*Example 3*

0.025 gram of Atmos 300 containing 54–59% monoglycerides was dissolved in 0.475 gram of coffee oil obtained by extracting roasted coffee with an organic solvent. This solution was mixed thoroughly with 99.5 grams of spray dried instant coffee. The mixture was estimated to contain about 140 parts of monoglycerides per million parts of instant coffee.

A sample of the product thus obtained and a control sample, prepared by thoroughly mixing 0.5 gram of coffee oil with 99.5 grams of granular, free flowing spray dried instant coffee, were subjected to the foaming test described in Example 1. The control sample showed a frothy foam which persisted for several minutes while the sample containing monoglycerides foamed initially but the bubbles broke quickly, leaving a clean surface in the center of the cup and only a ring of coarse bubbles clinging to the edge of the cup.

*Example 4*

One part of Aldo 40, a glyceryl oleostearate manufactured by Glyco Products Company, was thoroughly incorporated by grinding in a mortar with 99 parts of spray dried instant tea. Then 1 part of this pony was mixed with 49 parts of granular, free flowing spray dried instant tea by rolling for 20 minutes in a bottle equipped with a baffle.

A sample of the resulting product was compared for foaming characteristics with a control sample of spray dried instant tea containing no defoamer. To carry out this test 0.5 gram of each sample was placed in a cup and 150 ml. of cold tap water was poured into each cup. The contents of each cup were stirred vigorously with a spoon for about 10 seconds and observed after 2 minutes. The control sample showed a frothy foam which persisted for several minutes. The other sample foamed initially but the foam bubbles broke quickly to leave a clean surface in the center with only a ring of bubbles clinging to the edge of the cup.

The monoglyceride preparations useful in this invention have been found to be effective within a rather limited concentration range. In instant coffee the level used should be about 50 to 375 parts by weight of monoglycerides per million parts of instant coffee. The most effective level appears to be from 125 to 250 parts of monoglycerides per million parts of instant coffee. At levels below 50 parts of monoglycerides per million of instant coffee, there is little effect and the treated samples have an appearance similar to that of the untreated controls. At levels of 75–500 parts of monoglycerides per million of instant coffee, the monoglyceride preparations exert a visible effect by giving a coarser foam, but this foam is relatively persistent and stable.

Substantial defoaming activity was observed at levels between 100 and 2,000 parts of defoamer per million parts of instant tea. With Aldo 40 the best results were obtained at about 250 parts of the defoamer per million parts of instant tea.

It is well known that the monoglycerides of the higher fatty acids are surface active agents. As such, they are capable of promoting the formation of foam in aqueous solutions or dispersions. Suprisingly, however, at the low concentrations indicated above, they cause instant coffee, when dissolved in hot water, to produce a coarser foam than it would produce otherwise and a foam which breaks relatively rapidly. The result is less total foam and a foam that is more like the foam which appears when a hot water extract of ground, roasted coffee is poured into a cup.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

This application is a continuation-in-part of prior application Serial No. 41,238, filed July 7, 1960, and now abandoned.

We claim:

1. An instant beverage preparation of the group consisting of instant coffee and instant tea containing a small but effective amount of a monoglyceride of a higher fatty acid to substantially reduce foaming when the instant beverage preparation is dissolved in water.

2. An instant beverage preparation as defined in claim 1 wherein the fatty acid has from 16 to 18 carbon atoms.

3. An instant coffee containing from 50 to 375 parts of a monoglyceride of a higher fatty acid per million parts of instant coffee.

4. An instant coffee containing from about 125 to 250 parts of a monoglyceride of a higher fatty acid per million parts of instant coffee.

ing therein a small but effective amount of a monoglyceride of a higher fatty acid to substantially reduce foaming when the instant beverage preparation is dissolved in water.

5. An instant coffee containing a small but effective amount of a monoglyceride preparations, obtained by superglycerinating coffee oil, to substantially reduce foaming when the instant coffee is dissolved in water.

6. An instant coffee as defined in claim 5 wherein the amount of monoglyceride is within the range from 50 to 375 parts per million parts of instant coffee.

7. An instant coffee as defined in claim 6 which contains, in addition, a small amount of coffee oil.

8. An instant tea containing between about 100 and 2,000 parts of a monoglyceride of a higher fatty acid to substantially reduce foaming when the instant tea is dissolved in water.

9. A method of reducing the foaming tendency of an instant beverage preparation of the group consisting of instant coffee and instant tea which comprises incorporating therein a small but effective amount of a monoglyceride of a higher fatty acid to substantially reduce foaming when the instant beverage preparation is dissolved in water.

10. A method as defined in claim 9 wherein the fatty acid has from 16 to 18 carbon atoms.

References Cited in the file of this patent
UNITED STATES PATENTS

| | | |
|---|---|---|
| 2,929,716 | Barch et al. | Mar. 22, 1960 |
| 2,976,158 | Morgan et al. | Mar. 21, 1961 |

OTHER REFERENCES

"Surface Active Agents," 1949, by Schwartz et al., Interscience Publishers Inc. (New York), p. 8. (Copy in Div. 63.)

UNITED STATES PATENT OFFICE
CERTIFICATE OF CORRECTION

Patent No. 3,100,151                      August 6, 1963

Orville N. Breivik et al.

It is hereby certified that error appears in the above numbered patent requiring correction and that the said Letters Patent should read as corrected below.

Column 1, line 55, for "mixture" read -- mixtures --; column 2, line 6, for "Atoms" read -- Atmos --; line 22, for "monglyceride" read -- monoglyceride --; line 27, for "to" read -- then --; column 4, line 32, for "75-500" read -- 375-500 --; column 5, line 1, strike out "ing therein a small but effective amount of a monoglyc-" and insert the same after "incorporat-" in line 17, same column 5; column 5, line 3, for "preparations" read -- preparation --.

Signed and sealed this 21st day of January 1964.

(SEAL)

Attest:
ERNEST W. SWIDER                          EDWIN L. REYNOLDS

Attesting Officer                          Acting Commissioner of Patents